US012652282B2

(12) United States Patent
Varrier et al.

(10) Patent No.: US 12,652,282 B2
(45) Date of Patent: Jun. 9, 2026

(54) EVENT BASED AUTHENTICATION

(71) Applicant: Microsoft Technology Licensing, LLC, Redmond, WA (US)

(72) Inventors: Rahul Ramachandra Varrier, Bothell, WA (US); Shawn P. Henry, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 18/923,367

(22) Filed: Oct. 22, 2024

(65) Prior Publication Data

US 2025/0088502 A1    Mar. 13, 2025

Related U.S. Application Data

(63) Continuation of application No. 17/842,297, filed on Jun. 16, 2022, now Pat. No. 12,149,523.

(51) Int. Cl.
*H04L 9/40*        (2022.01)
*G06F 21/36*        (2013.01)

(52) U.S. Cl.
CPC .......... *H04L 63/083* (2013.01); *H04L 63/102* (2013.01); *H04L 63/108* (2013.01); *H04L 63/20* (2013.01); *G06F 21/36* (2013.01)

(58) Field of Classification Search
CPC ....... H04L 9/40; H04L 63/083; H04L 63/102; H04L 63/108; H04L 63/20; G06F 21/36
See application file for complete search history.

(56) References Cited

U.S. PATENT DOCUMENTS

| | | | | |
|---|---|---|---|---|
| 10,033,724 B2 * | 7/2018 | Donohue | ............ | H04L 63/0838 |
| 10,848,482 B1 * | 11/2020 | Eisen | .................... | G06F 40/289 |
| 2010/0180336 A1 * | 7/2010 | Jones | .................... | H04L 9/3226 |
| | | | | 726/19 |
| 2014/0331286 A1 * | 11/2014 | Davis | .................... | H04L 9/3215 |
| | | | | 726/4 |
| 2015/0269376 A1 * | 9/2015 | Keohane | ................ | G06F 21/36 |
| | | | | 726/19 |
| 2016/0219036 A1 * | 7/2016 | Devkar | ................. | H04L 9/3226 |
| 2023/0281295 A1 * | 9/2023 | Secomandi | .......... | H04L 63/083 |
| | | | | 726/18 |

* cited by examiner

*Primary Examiner* — Jayesh M Jhaveri
(74) *Attorney, Agent, or Firm* — Schwegman Lundberg & Woessner, P.A.

(57)        ABSTRACT

A method and system for determining a custom personal identification number (PIN) for a user based on an ordered series of events are disclosed, comprising generating the custom PIN for the user based on a set of stored events of the user, each event associated with a point in time and authenticating the user responsive to receiving information that matches the custom PIN. A chronological order of a selected subset of events can be determined. A chronological identifier can be assigned representative of a position of the respective event in the determined chronological order. The custom PIN can be determined as an arrangement of the chronological identifiers. The selected subset of events can be presented to the user in the arranged order. The user can be authenticated responsive to determining that a received indication of a chronological arrangement matches the determined PIN.

20 Claims, 8 Drawing Sheets

500

EVENT BASED AUTHENTICATION

TECHNICAL FIELD

This application is a continuation application of application Ser. No. 17/842,297, filed Jun. 16, 2022, which application is incorporated by reference herein in its entirety.

TECHNICAL FIELD

The present disclosure generally refers to methods and systems for providing user-event-based authentication services for a user in accordance with some embodiments.

BACKGROUND

The use of software and hardware technologies for secure communications and financial transactions continues to increase as technology evolves. Securing access to systems and sensitive information associated with such communications and financial transactions, such as by verifying user identity, has become an increasing technical challenge. Verification and authentication techniques must be secure but not unduly burdensome.

SUMMARY

Embodiments of the present disclosure include a method and system for determining a custom personal identification number (PIN) for a user based on an ordered series of user events. A custom PIN can be generated for the user based on a set of stored events, each event associated with a specific point in time. The user can be authenticated by providing information that matches the custom PIN. Generating the custom PIN can include selecting a subset of user events from the set of stored events of the user, determining a chronological order of the selected subset of events based on the associated point in time for each of the selected subset of events, assigning each of the selected subset of events a chronological identifier representative of a position of the respective event in the determined chronological order, and determining the custom PIN as an arrangement of the chronological identifiers in an arranged order that is not chronological. The selected subset of user events can be presented to the user in the arranged order for subsequent chronological arrangement by the user. The user can be authenticated responsive to determining that an indication of a received chronological arrangement matches the determined custom PIN.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
FIG. 1 illustrates an example system including a user device and an authentication service.
Figure 1:
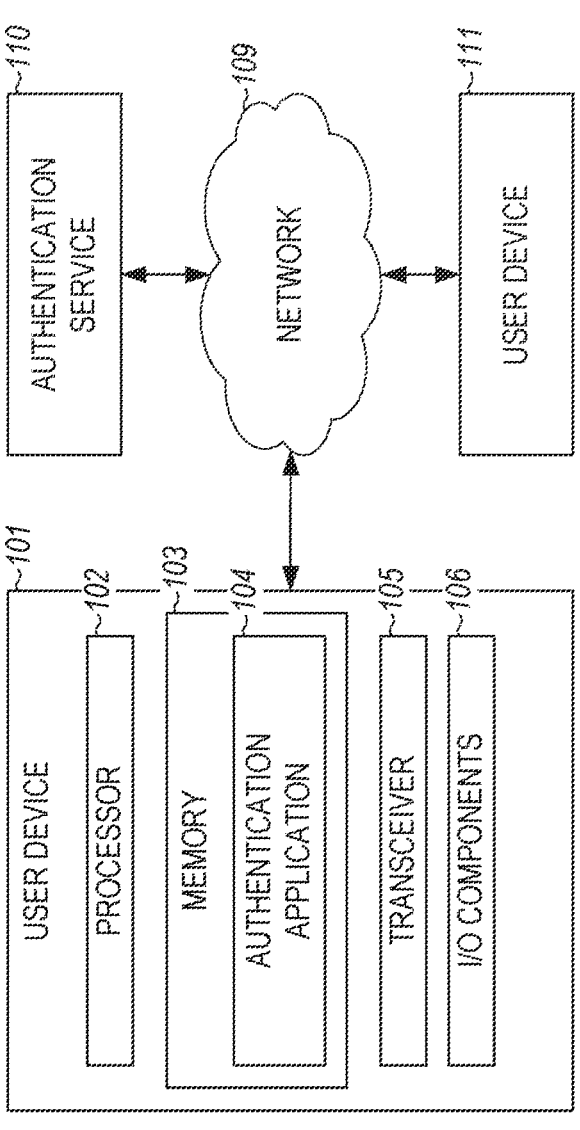

Authentication and verification are related concepts in the information security field and are often used interchangeably. Broadly speaking, authentication is the act of proving an assertion. For example, the acts of logging into an online account by entering a correct username and password combination, completing a credit card transaction by providing the multi-digit security code printed on the physical card associated with the credit card number and expiration date, unlocking a mobile device by a correct passcode, unlocking a computer with a correct password can each be considered authentication acts. However, one person may have the correct username and password combination for an account belonging to another person. A third party may have access to the multi-digit security code printed on the physical credit card of another. A passcode to a mobile device of one person may be shared with another person, or a password of a computer of one person may be shared with another person. Certain information can be correctly provided to authenticate an act, while not verifying the identity of user requesting the act.

Verification, in contrast, is the act of verifying that a user is who they claim to be, and often requires confirmation or interaction with some information originally provided when first accessing the requested resource. Confirming that an identification of a person who presents a credit card at an in-person transaction matches the card details is a verification act. Authentication often requires verification, such that authentication can include verification. In certain examples, a second authentication, such as with another piece of information, can be a form of verification.

The fields of authentication and verification continue to evolve, such as two-factor authentication or verification techniques requiring a user to perform coordinated actions on multiple devices, such as requesting access by a user on one account or device and verifying the action using a second known account or device of the user, or by requesting multiple pieces of information. Successful two-factor authentication, such as by successive first and second authentications, reduces the likelihood that the first successful authentication was an attack, as it is less likely that an attacker will have access to multiple devices or additional correct information.

Other verification techniques require access to biometric information of the user, access to multiple secured systems, or different passwords or combinations of logins (e.g., login via a username and password at a first point, and text verification at a second point, etc.). For example, a user requesting access to a first system can be provided a one-time password to a second system associated with the user, such as a mobile device (e.g., a cellular number) or email account, etc. The benefit of one-time passwords or time-based one-time passwords is that they expire after a single use or in a relatively short window after request, adding obfuscation by changing the password at each request, requiring a less secure password (e.g., less characters, etc.). Additional verification techniques include an authenticator application to supplement a first authentication by directly connecting to the first authentication source to exchange public/private key information, or provide a private key to the user in response to a second authentication via password, PIN, or biometric information, that the user can provide to the source of the first authentication for subsequent authentication between the private key.

However, using biometric information of the user can be problematic, as it cannot be reasonably changed by the user, and the risk of exposure, such as by a data breach or otherwise, is costly. Further, as use of mobile devices increases, or reproduction of communication across multiple devices (e.g., receiving SMS texts on both a mobile phone and a computer, accessing multiple email addresses on one device, accessing secured accounts from a mobile device with the mobile device as the second, one-time passwords are often sent to the device requesting the original authentication, which limits the benefit of the one-time password, for example, if the device is unlocked (which it is if requesting the one-time password, the original authentication, etc.), or if the password is provided in a preview viewable to third parties, etc. Additionally, use of the authenticator applications are generally tied to an individual device, which can be lost, mislaid, or forgotten, or operate on limited battery power or connectivity, or stop working for one or more other reasons.

Accordingly, the present inventors have recognized, among other things, that there is a need to further increase the security of one-time passwords using information about events of the user, and in certain examples, a relative chronological order of a subset of a larger set of stored events of a user. Additional benefits include the use of any device to provide verification, including point of sale devices, automated teller machines (ATMS), without the disclosure of information that can be easily replayed, while having the benefit of being repeatable by the user in any number of permutations or combinations. Recalling events, or the order of events, especially those relevant enough to provide (e.g., when prompted), or specifically provided as challenge events during setup of an authentication service or creation of a new account, etc., is a relatively secure way to produce repeatable combinations of information for the user which can be difficult or nearly impossible to recreate by another person, in certain examples, as described below, such as additionally with respect to other time, duration, or other safeguards.

Further, events can be specific to a user, but obfuscated generally. For example, if prompted, a user can provide a relevant event as the time they were bitten by a dog during high school. Two time-ordered events can be created from that single piece of information: (1) an event related to a dog, such as represented by a simple dog icon, or alternatively the word "dog"; followed by (2) a graduation represented by a diploma or a graduation cap icon, or alternatively the word "graduation". The systems and methods disclosed herein can provide these events, as two of a larger number of events, to place in proper chronological order. To the user, the order and specific details of such events is memorable, especially in context with their setting up the events for use in authentication/verification. However, a third party lacks the proper context to accurately understand the meaning of such events, or to position such events chronologically, relative to other events. The third party has no way of knowing if the dog icon or word represents a childhood pet, a first pet in adulthood, or any number of other dog-related events, much like a third party does not know whether or not the most memorable graduation for the user is a high school graduation, a graduate school graduation, the graduation of a child, etc. Without context, the events become increasing difficult understand or place in order.

The dog and graduation example above contains only two events. The difficulty increases by adding additional events. Additionally, other rules can be implemented on the selection of events, for example, requiring that at least two of the selected subset of events for display occur within an absolute or relative time window (e.g., relatively close in time), to further increase the difficulty of a third party guessing a proper chronological order. For example, two additional time-ordered events can include a knee injury that occurred shortly after a first trip to Paris, each occurring in a specific time window (e.g., within 2 years, but more than 10 years ago, etc.). The knee injury can be represented by an icon of a knee generally, and the first trip to Paris by an icon of the Eiffel Tower. The systems and methods disclosed herein can select these four events as icons (e.g., dog, diploma, Eiffel Tower, and knee) and present them to the user in a random order on any device. Alternatively, the events can be represented by text descriptions (e.g., simple words or combinations, such as "dog", "diploma", "Eiffel Tower", and "knee", etc.). Properly ordering the four events as words or icons within a challenge window (e.g., 15 seconds) can authenticate the user. Stealing the user device provides no benefit in quickly ordering these simple icons.

A larger set of events (e.g., 10 or more, 20, etc.) can be received, obfuscated, and stored by an authentication service or an authentication application in relative chronological order, or with any specific date information provided by the user. In certain examples, specific data information can be used as an additional verification, such as after a first failure or timeout, etc. A new pin (e.g., random selected 4 events) can be selected at each request. The order and events can be displayed to the user in various ways, and the user can provide the proper chronological order in various ways, such as described herein.

A technical solution contemplated herein provides, in certain examples, a delivery-channel agnostic, secure, easy-to-remember, PIN generation technique and subsequent systems and methods for authentication based on a specific chronological arrangement of store user events to address the technical problems of improving data security and techniques to improve reliable, secure access to communication, financial transactions, and other access to sensitive information while reducing reliance on control and possession of particular devices with varied power status and connectivity.

FIG. 1 illustrates an example computer system 100 for providing authentication services including first and second user devices 101, 111 and an authentication service 110 coupled to a network 109.

The first user device 101 is exemplary, and can include a processor 102 (e.g., one or more processors), a memory 103, a transceiver 105, and one or more input/output (I/O) components 106. The memory 103 can include an authentication application 104, in certain examples configured to interact with or connect to the authentication service 110. While the authentication application 104 can be executed on the first user device 101 (or one or more other user devices), the authentication service 810 is separate and remote from the first user device, and can include server, network, or cloud-based services accessible over the network 109.

The authentication service 110 can include one or more devices (e.g., one or more processors, a transceiver, memory, storage, database, server, etc.) configured to manage authentication of a user of or associated with one or more user accounts, devices (e.g., the first and second user devices 101, 102), or other secure features, services, transactions, or information, etc.

In an example, one or more of the authentication application 104 or the authentication service 110 can be configured to determine a custom personal identification (PIN) for a user based on an ordered series of events. In an example, the authentication application 104 can be configured to receive a request for a custom PIN, such as in response to an action by a user of the first user device 101 logging into an application, service, or system, or making a purchase or request through the first user device 101 or one or more other financial or retail services, where the application, service, or system requests authentication of the purchase or request. The authentication application 104 can provide the received request to the authentication service 110. In other examples, the authentication service 110 can receive the request for the custom PIN directly, such as through the application, service (e.g., financial service, retail service, etc.), or system, etc.

Responsive to receiving the request for the custom PIN, the authentication service 110 can generate the custom PIN for the user based on a set of stored events (e.g., stored user-ordered events of the user or otherwise, etc.), each event associated with a specific or relative point in time. One or both of the authentication service 110 or the authentication application 104 (e.g., such as the authentication service through the authentication application 104, etc.) can be configured to receive event information from the user and create a set of user-ordered events of the user, in certain examples, obfuscating personal details of the event, but providing enough specificity for the user to recognize the intended event based on the event information, and confirming such obfuscation with the user.

The events can be stored in the order in which they occurred to the user, from the earliest event to the latest event. In certain examples, a specific time or time period can be received for each event or for a group of events, such as to be used for additional confirmation if needed at a later time. The set of user-ordered events of the user can be stored by the authentication service 110, such as at a server, in a database, associated with a user profile of an account, etc. In certain examples, the authentication service 110 can have access to user profile information of the user and can use information from the user profile to create draft user events for confirmation by the user.

In other examples, responsive to receiving the request for the custom PIN, the authentication application 104 can generate the custom PIN for the user based on a set of stored user-ordered events of the user, either received from the authentication service 110 or a server or database associated with the authentication service 110, or using one or more stored user-ordered events stored at the first user device 101, such as for times when the network 109 is unavailable to the first user device 101, or the first user device 101 cannot access the authentication service 110, etc. For example, if the authentication service 110 has access to a first set of user-ordered events (e.g., 10 or 20, etc.), the first user device 101 can, in certain examples, receive and store a minimum subset (e.g., 4, etc.) of the larger set in case of loss of connectivity, etc. The minimum subset can have limited uses before expiration, where connectivity will be required to provide additional authentication or authentication attempts.

In an example, one or more of the authentication service 110 or the authentication application 104 can be configured to cause a selected subset of events to be presented to the user in an arranged order. In certain examples, the arranged order can include a chronological order as a possibility, such that the events can be randomly selected or arranged in an order that is already chronological (from earliest occurring to latest occurring, etc.). In other examples, the arranged order can exclude a chronological order, such that the user must make at least one change for authentication, etc. However, as will be discussed, certain presentations require user input in any case, such that a 4-digit pin could be entered as "1234", or a subset of 4 images for placement in chronological order may still require dragging and dropping all 4 images into the same order they were presented, etc. In such situations, where user input is required and the order cannot be selected as initially presented, the arranged order can optionally include a chronological order.

The subset of events can be displayed by, and the chronological arrangement can be received from, the first user device 101 or one or more other devices (e.g., a point-of-sale device, an ATM machine, one or more other user devices (e.g., the second user device 111, etc.). In certain examples, the device that displays the subset of events can be the same as or different than the device that receives the chronological arrangement, such as discussed herein.

One or both of the authentication service 110 or the authentication application 104 (e.g., such as the authentication service 110 through the authentication application 104, etc.) can be configured to authenticate the user, such as by matching the received chronological arrangement to the generated custom PIN. If the received chronological arrangement is indicative of an order different the stored user-ordered events, the system will not authenticate the user. Performing authentication, by one or more devices, applications, or services, can result in a positive outcome (e.g., authenticating the user), a negative outcome (e.g., failing to authenticate the user). An error during authentication will provide a negative outcome.

Figure 2:
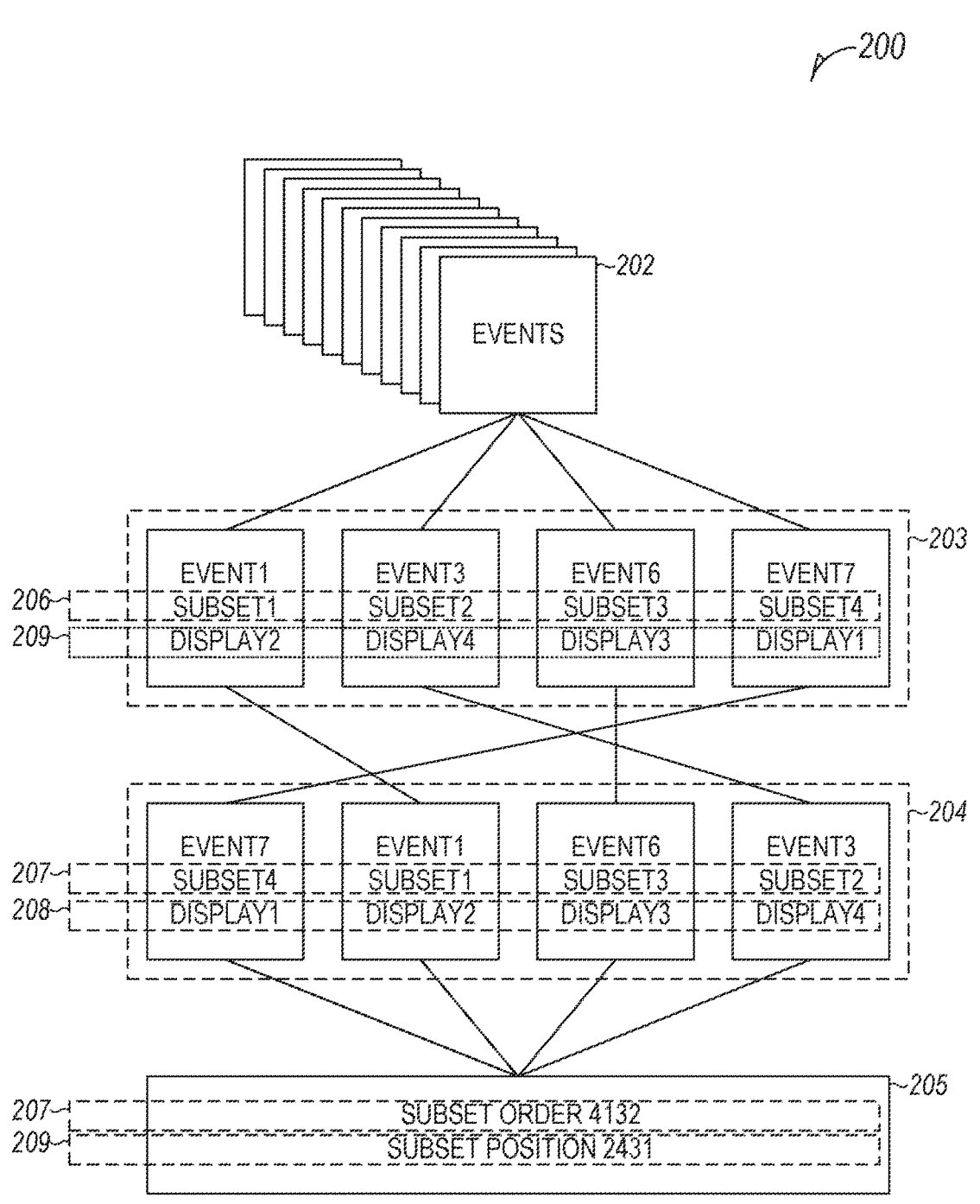
FIG. 2 illustrates an example authentication technique to generate a personal identification number (PIN).

FIG. 2 illustrates an example authentication technique 200 to generate a personal identification number (PIN), such as using one or both of an authentication service or an authentication application executed on a user device, in certain examples connected to the authentication service, such as described herein.

A set of events 202 of the user can be stored, each vent associated with a point in time, and in certain examples, in a user-defined order, as they occurred to the user, from earliest to most recent. The number of events in the set of events 202 can vary, but in certain examples must be at least greater than 2. In an example, to balance security and setup costs, such as in generating or receiving the set of events, if 4 events are required in the subset for ordering (e.g., a 4-digit PIN), at least 6 events (e.g., 1.5X) can be required in the set of events 202, providing 15 unique combinations of events in chronological order, and 360 unique orders of presentation for chronological arrangement by the user to recover the generated PIN. In an example, if 4 events are required in the subset and at least 7 events are required in the set of events 202, 35 unique combinations of events in chronological order can be provided, and 840 unique orders of presentation for chronological arrangement by the user to recover the generated PIN. In other examples, other combinations of the set and subset can provide other numbers of unique combinations and possible orders for presentation, such as illustrated in Table 1.

TABLE 1

| Example Set/Subset Combinations | | | |
| --- | --- | --- | --- |
| Subset | Set | Unique Combinations | Scrambled Presentations |
| 3 | 6 | 20 | 120 |
| 4 | 6 | 15 | 360 |
| 4 | 7 | 35 | 840 |
| 4 | 8 | 70 | 1680 |
| 4 | 12 | 495 | 11880 |
| 4 | 16 | 1820 | 43680 |
| 4 | 20 | 4845 | 116280 |
| 5 | 10 | 252 | 30240 |
| 5 | 15 | 3003 | 360360 |
| 5 | 20 | 15504 | 1860480 |
| 6 | 12 | 924 | 665280 |
| 6 | 20 | 38760 | 27907200 |

A first subset of events 203 of the set of events 202 can be selected for presentation to the user to be placed in chronological order. However, the odds of guessing the correct order of the presented subset are directly dependent on the number of events presented in the subset. If the subset of events 203 has 3 events, there are only 6 possible different combinations, leaving a 1/6 or 16.6% chance of correctly placing the events in the proper order without knowledge of the events. If the first subset of events 203 has 4 events, there are 24 possible different combinations, leaving a 1/24 or 4.16% chance of correctly identifying the proper order without knowledge of the events. If the first subset of events 203 has 5 events, there is a 1/120 or 0.83% chance of correctly identifying the proper order. If the first subset of events 203 has 6 events, there is a 1/720 or 0.13% chance of correctly identifying the proper order.

In other examples, to further increase security, first and second generated PINS can be generated and displayed for chronological arrangement by the user, or in certain examples, first, second, and third, where each must be matched for authorization. For example, sequential selections of the first subset of events 203 of 3 events can decrease the chance of placing the events in the proper order from 16.6% to 2.7%. Three successive selections of the first subset of events 203 of 3 events can further decrease the chance of placing the events in the proper order to 0.4%. Successive selections of 4 events can decrease the chance of placing the events in the proper order from 4.16% to 0.17%.

In FIG. 2, the first subset of events 203 includes 4 events: EVENT1, EVENT3, EVENT6, and EVENT7 with respect to the set of events 202, placed in chronological order and having chronological identifiers 206 as SUBSET1-SUBSET4 with respect to a chronological order of the selected first subset of events 203. In an example, the first subset of events 203 can be randomly selected and placed in chronological order. In other examples, the first subset of events 203 can be a specific selection based on past selections, enforcing one or more time rules (e.g., two events taking place within a preset interval, such as two events in the same year, but both taking place more than 5 years ago, etc.), etc.

In certain examples, the selected first subset of events 203 can be arranged into a second subset of events 204, such as for presentation or display to the user, including a subset order 207 (e.g., SUBSET4, SUBSET1,SUBSET3, SUBSET2, or "4132") and position identifiers 208 (e.g., DISPLAY1-DISPLAY4). Arrangement can include a random rearrangement or shuffling, etc., in certain examples, enforcing that the presentation or display is not in chronological order with respect to the associated point in time for each event, such as when the user is tasked with adjusting the events in-place (e.g., swapping instead of dragging from separate display and accept regions, etc.). In an example, requiring at least one move can be preferred. In other examples, chronological presentation is allowed, such that the events can be accepted as in order as presented.

In FIG. 2, the second subset of events 204 has been arranged in the following order: EVENT7, EVENT1, EVENT6, and EVENT3, providing an adjusted subset order 207 of: SUBSET4, SUBSET1, SUBSET3, and SUBSET2, respectively, as position identifiers 208 DISPLAY1-DISPLAY4. A custom PIN 205 can be generated from the second subset of events 204 as the relative subset order 207 of "4132", or alternatively as a subset position 209 of "2431", as SUBSET1 is arranged in the second display position (DISPLAY2), SUBSET2 is arranged in the fourth display position (DISPLAY4), SUBSET3 is arranged in the third display position (DISPLAY3), and SUBSET4 is arranged in the first display position (DISPLAY1). The custom PIN 205 can be considered the subset order 207 ("4132") or the subset position 209 ("2431") depending upon whether the order or the position of the order is requested to recover or identify the custom PIN 205.

In other examples, the custom PIN can be determined, such as an arrangement (e.g., random arrangement) of a number of identifiers that are not in sequential order, and a subset of events can be selected for display in accordance with the determined custom PIN for display.

Figure 3:
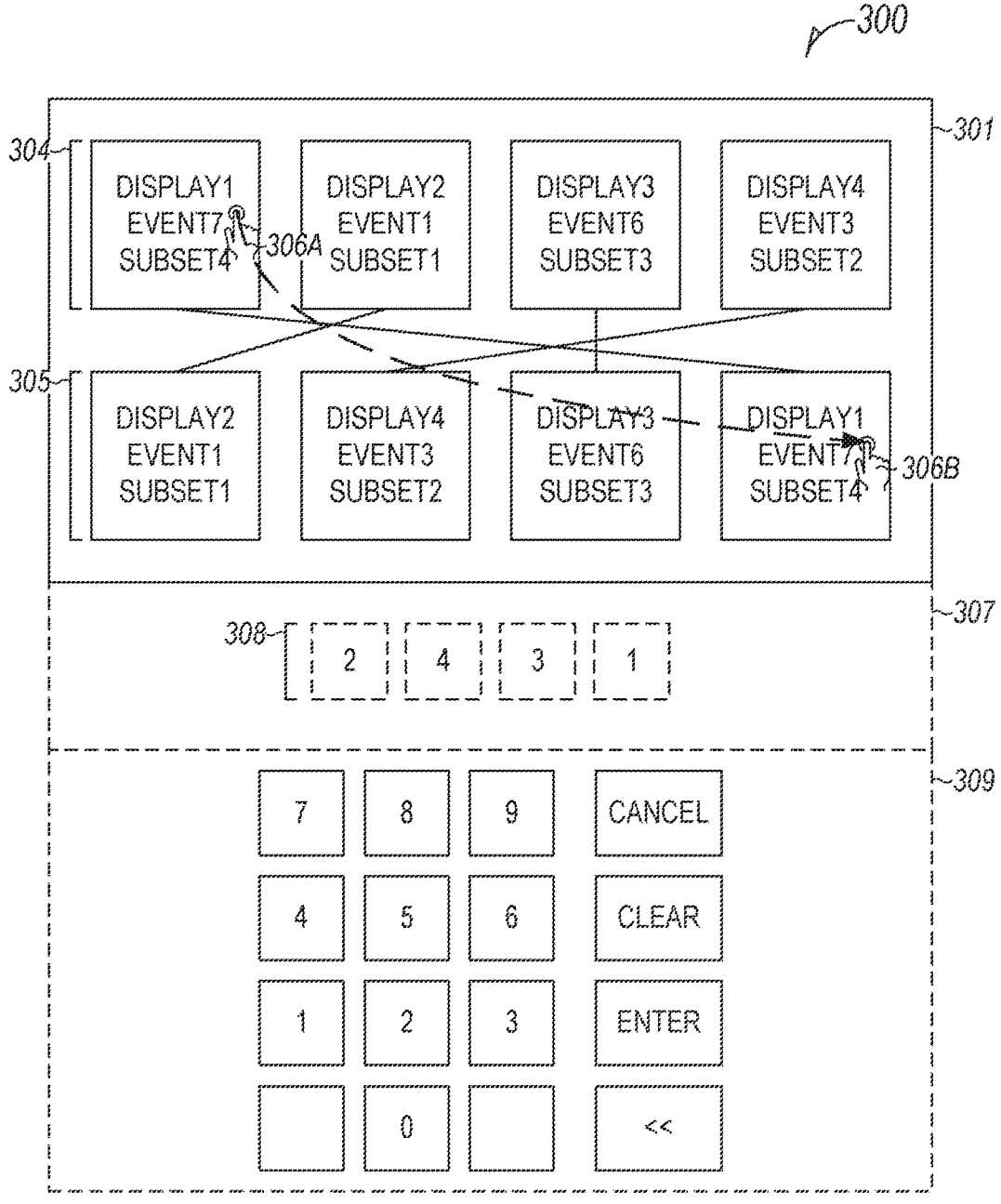
FIG. 3 illustrates an example authentication process of recovering a generated PIN.

FIG. 3 illustrates an example authentication process 300 of recovering or identifying a generated PIN, including a display 301 configured to present a selected subset 304 of events in an arranged order. For example, the selected subset 304 can include the second subset of events 204 illustrated in FIG. 2. In certain examples, the display 301 can include a touch-screen display, and the user can be instructed to drag individual events of the selected subset 304 into a chronological order, for example, as a third subset 305. In this example, the user can select a first event (DISPLAY1) at 306A and drag the selected first event to the fourth position (SUBSET4) at 306B in the third subset 305, correctly identifying DISPLAY1 and SUBSET4. In certain examples, the system can compare the order of the third subset 305 to the order of the first subset of events 203 from FIG. 2, or to the equivalent order based on the generated PIN, etc., and if it matches, authenticate the user.

As an additional challenge, if known, a specific year of occurrence of one or more of the displayed or other events can be asked of the user, or one or more other challenge questions based on the information about one or more of the displayed or other events. Alternatively, instead of dragging the events to the third subset 305, in certain examples the user can swap positions of the selected subset 304 in place, without a complete separate displayed subset.

In an example, the display 301 can optionally include a PIN section 307, such as to display a PIN-equivalent of the chronological arrangement 308 of the third subset 305, such as for entry at another device, etc. In other examples, the PIN section 307 can be included instead of or in addition to the third subset 305, such as to receive a chronological arrangement 308 of the selected subset 304 from the user, for example, input on a number pad 309 or entered by one or more I/O components of a user device, etc. For example, the chronological arrangement 308 in FIG. 3 is: 2431, representing that the earliest event (the first event in relative chronological order, with respect to the other events in the selected subset 304) in the selected arrangement is in the second position, the second event (in relative chronological order) is in the fourth position, the third event (in relative chronological order) is in the fourth position, and the fourth event (in relative chronological order) is in the first position.

In other examples, display of the selected subset 304 of events can be provided by a first device, and the PIN section 307 can be entered at a second device. For example, the selected subset 304 of events can be displayed to the user at a first user device (e.g., a mobile device), and the PIN section 307 can be provided at a second device for entry (e.g., a point-of-sale terminal, an ATM, an application executed on the second device, etc.). In certain examples, the selected subset 304 of events can be provided by an authentication application on the first user device, and input on a separate application of the first user device or one or more other devices, such as to authenticate or verify the user on the second application.

In certain examples, the events displayed on the authentication application executed on a personal user device of the user (e.g., a mobile phone, etc.) can include more personal information than equivalent events displayed at one or more other devices, such as point of sale devices, on a web application, etc.

Figure 4:
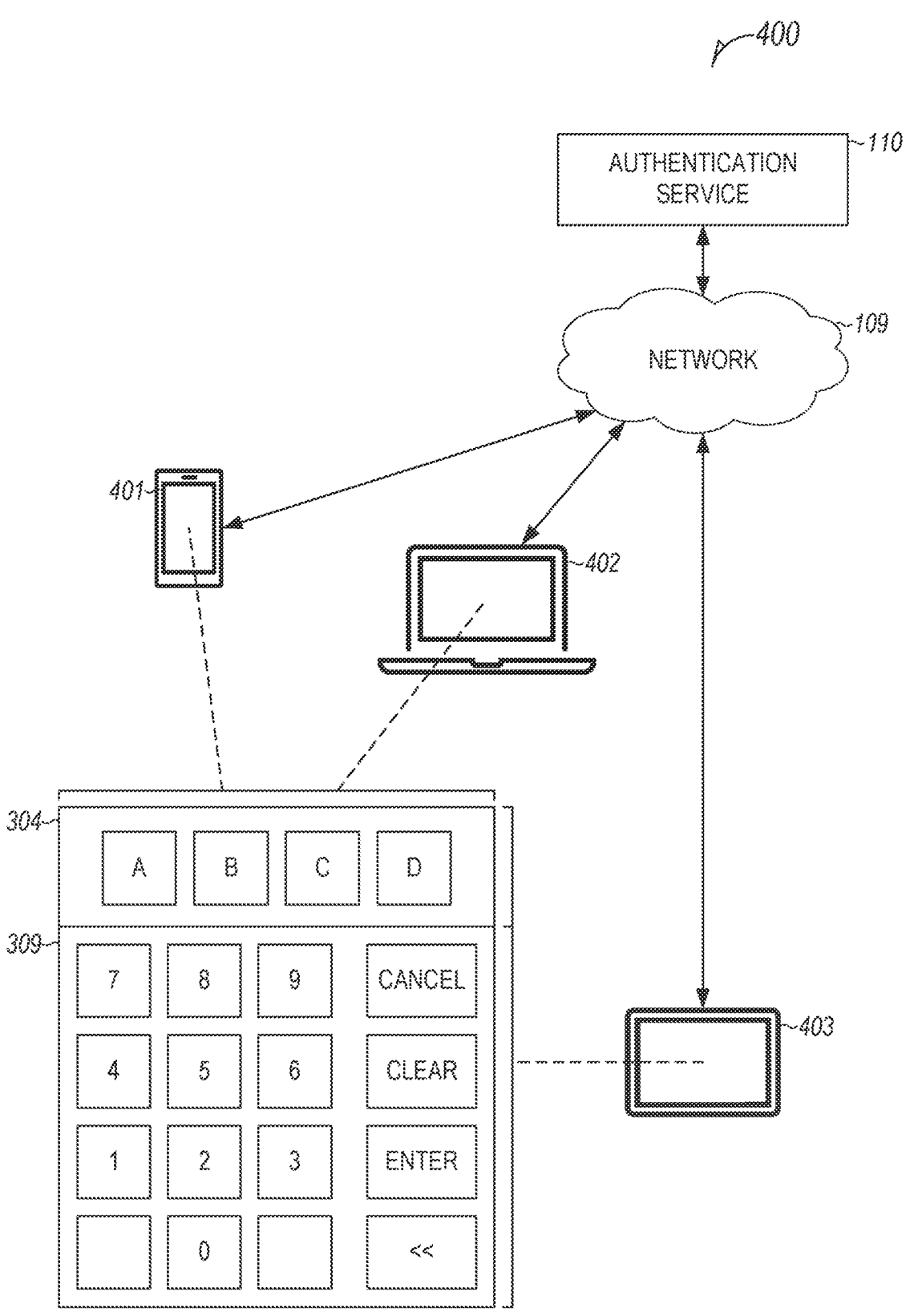
FIG. 4 illustrates example devices for authentication.

FIG. 4 illustrate example system 400 for authentication, including first, second, and third devices 401-403, the first and second devices 401, 402 including devices controlled by a user requesting access or an action that triggers authentication, and the third device 401 not controlled by the user, but instead a third party, such as a point-of-sale device of a retailer, an automated teller machine, etc. Each of the first, second, and third devices 401-403 can be coupled to an authentication service 110 over a network 109.

A selected subset 304 of events, such as illustrated in FIG. 3, can be displayed to a user, for example, using one or more of the first, second, and third devices 401-403. Additionally, a number pad 309 can optionally be included on one or more of the first, second, and third devices 401-403. In certain examples, the selected subset 304 of events can be displayed on a device including the number pad 309. In other examples, the selected subset 304 of events can be displayed on one device, and the number pad 309 can be displayed on another device.

In certain examples, the authentication service 110 can control delivery of the selected subset 304 of events and compare received input to the generated PIN. In other examples, an authentication application executed on a user device can control delivery of the selected subset 304 of events and compare the received input to the generated PIN.

Figure 5:
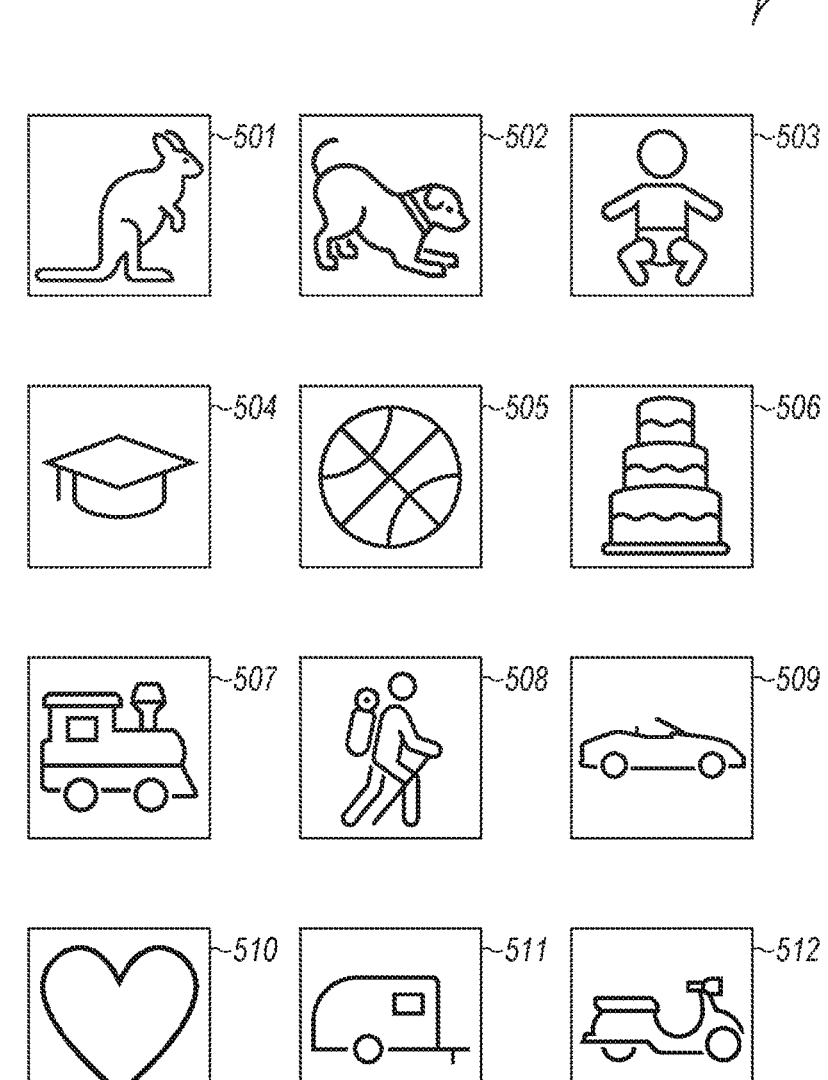
FIG. 5 illustrates example events of a user.

FIG. 5 illustrates example events 500 of a user, including first-twelfth events 501-512, each illustrating various information about an event of the user as icons. Alternatively, each event can alternatively be illustrated as simple text descriptions, or combinations of icons, other images, or text descriptions, etc.

For example, if the user provides information about traveling to Australia at a particular time, a simple icon of a kangaroo, the first event 501, can be selected to represent such event. The second event 502 is an icon of a dog. While unclear to a hypothetical attacker, the user can provide information about a dog, such as the time of their first childhood, or the time of their first dog as an adult, etc. The third event 503 can include an icon of a child, which can represent the user's own childhood, or possibly the birth of a child of their own, or their first grandchild, etc. Without more context, it's difficult to know the order the user assigned the event.

The fourth event 504 is a graduation cap. Again, it is unclear whether the graduation is of the user or of a child or grandchild. The fifth event 505 is a basketball, which can represent a year in which the user's favorite team won a championship, or alternatively when the user played basketball growing up. The sixth event 506 is a cake, which could represent the user's wedding date, or possibly the wedding of a child, etc. The remaining events 507-512 each refer broadly to an icon that can have different meanings to different people, as well as different attributable time periods. It can be difficult for even someone with intimate knowledge of the user what the chronological arrangement of the icons should be unless the full context and meaning of such events to the user are known.

Figure 6:
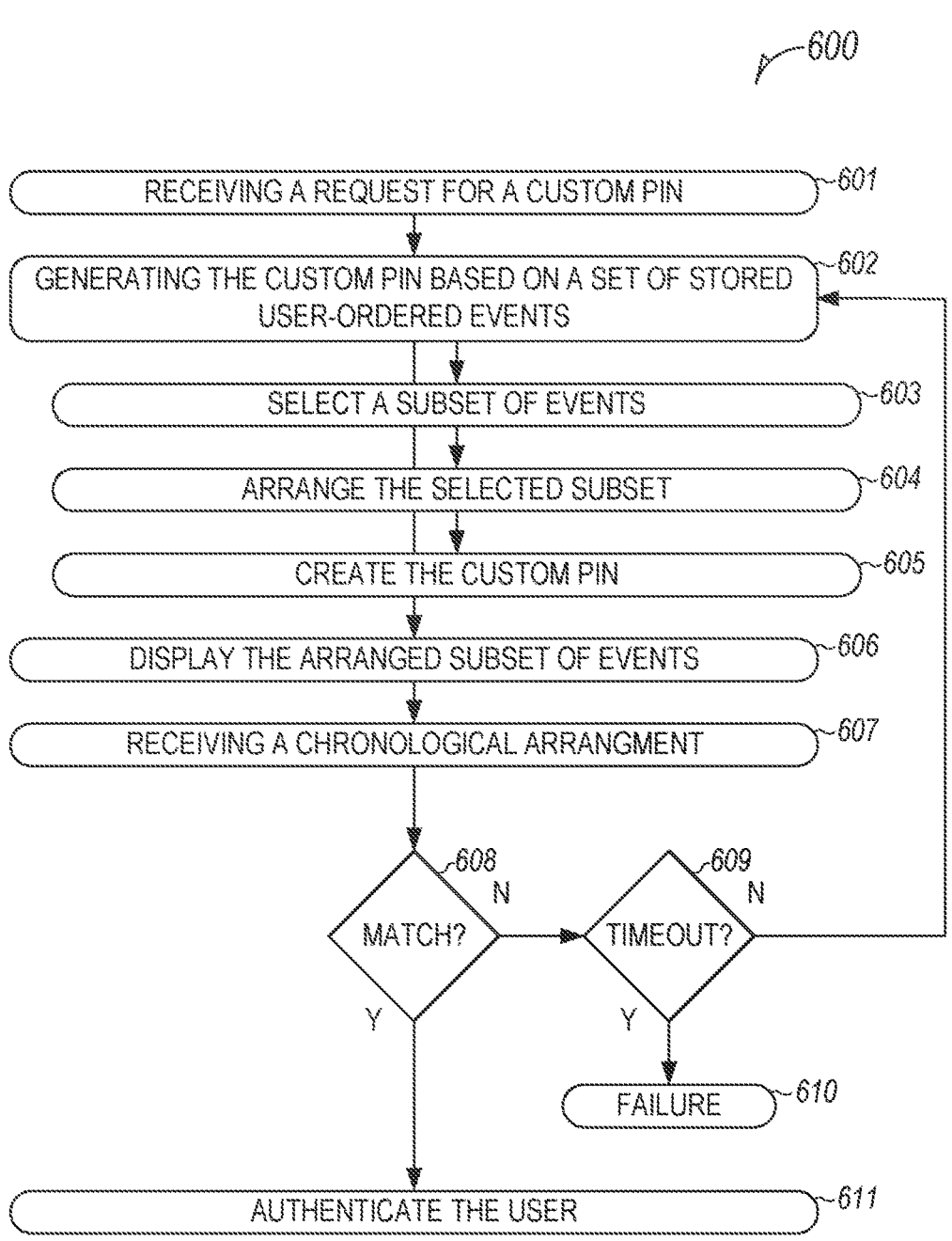
FIG. 6 illustrates an example method of requesting a custom PIN for a user and authenticating the user using the custom PIN.

FIG. 6 illustrates an example method 600 of requesting a custom PIN for a user and authenticating the user using the custom PIN.

At step 601, a request for a custom PIN can be received, such as with respect to a request for access to a secure resource. The request can be received at an authentication application of a user device or by an authentication service, in certain examples, connected to the authentication application through a network, etc.

At step 602, a custom PIN can be generated based on a set of stored user-ordered events. The set of stored user-ordered events can be generated, received, or stored by the authentication service, and the custom PIN can be generated using the set of stored user-ordered events. To create the custom PIN, a subset of events can be selected and arranged, and the custom PIN can be generated using the arranged order of the selected subset of events.

At step 603, a subset of events can be selected, such as from the set of stored user-ordered events. The subset can include a number of events less than the set, such as between 3 and 5 events, 4 events, etc. In certain examples, the events can be randomly selected, or selected to satisfy certain conditions. For example, specific filters or rules can be placed on selection and arrangement, such as to ensure that events are not presented to a user in an already-chronological order (e.g., relative to the subset), that two or more events in the subset take place within a specific time window (e.g., within a year, within 2 years, etc.), that the subset includes both recent and non-recent events (e.g., more than 5 years ago, more than 10 years ago, etc.), or combinations thereof.

At step 604, the selected subset can be arranged, such as in an order that is not chronological in time. In an example, the arrangement can be random, but checked to ensure that a chronological order is not presented to the user for authentication. In other examples, such as when requiring the user to input a numerical representation of the order, or to move all events, whether they are presented in an initial chronological order or not, the order may be presented as chronological relative to the other events in the subset.

At step 605, the custom PIN can be created, such as using the arranged order of the selected subset of events. In certain examples, the custom PIN can be representative of the arranged position of the events relative to their chronological order in the subset, such as described herein.

At step 606, the arranged subset of events can be displayed to the user in the arranged positions used to generate the custom PIN. In an example, displaying can include by one or more devices, at the direction of the authentication application or the authentication service.

At step 607, a chronological arrangement can be received, such as responsive to displaying the arranged subset of events to the user. In certain examples, the chronological arrangement can be received by the device displaying the arranged subset of events, such as by presenting the events on a touch-screen interface and receiving a chronological arrangement of such events (e.g., by swapping positions of the displayed events, by dragging the events from a first displayed subset to a different chronological subset, etc.). In other examples, the chronological arrangement can include a numerical response to the provided display, using the device displaying the arranged subset of events or separately using on or more other devices.

At step 608, the received chronological arrangement can be compared to the generated custom PIN to determine if the received chronological arrangement matches, or is equivalent to, the generated custom PIN. In an example, the received chronological arrangement can include received positions of the displayed events. A received PIN can be created based on the received chronological arrangement. In other examples, the received chronological arrangement can include a numerical representation of the received chronological arrangement including or equivalent to the received PIN. The received PIN can be compared to the custom PIN.

For example, if the received chronological arrangement does not match the generated custom PIN at step 608, the method can proceed to step 609 to optionally determine if the authentication attempt has timed out. In an example, the authentication attempt can timeout if the time required by the user to provide the chronological arrangement exceeds a threshold. In other examples, the authentication attempt can timeout if the chronological arrangement fails more than once. In certain examples, such as in cases requiring increased security, the user must pass multiple authentication attempts to be authenticated. In certain examples, step 609 can occur before step 608, such as part of step 607 or shortly thereafter, by determining the time required for the user to provide and the method to receive the chronological arrangement.

In other examples, the time of receiving the chronological arrangement after displaying the arranged subset of events can determine whether or not the user must pass multiple successful authentication attempts to proceed. For example, if an authentication timer, or a threshold at which the chronological arrangement must be received from the user following displaying the arranged subset of events, is 20 seconds, a matching response under a first subthreshold (e.g., 10 seconds, etc.) may authenticate the user, whereas a matching response between the first subthreshold and the authentication timer (e.g., between 10 and 20 seconds, etc.) may require repeating the authentication attempt before authentication is successful. The time periods disclosed herein are exemplary, and in other examples, other time thresholds with similar or other ratios can be used.

If the authentication attempt has timed out, such as exceeding the authentication timer or failing more than a threshold number of authentication attempts, the authentication attempt can fail at step 610. In certain examples, each authentication attempt can include using a different subset of events and accordingly a different custom PIN.

If the received chronological arrangement matches the generated custom PIN at step 608, the user can be authenticated and provided access to the requested resource, or an indication of a successful authentication can be provided to the requested resource, at step 611.

The method 600 can be performed by a user device, such as using an authentication application, by an authentication service, or combinations thereof, including by the authentication server through the authentication application executed on the user device and connected to the authentication service, etc.

Figure 7:
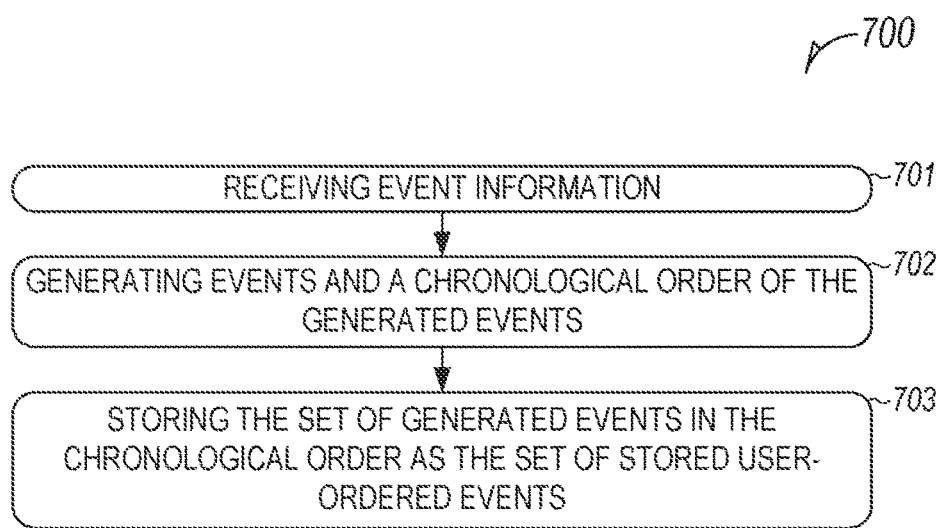
FIG. 7 illustrates an example method of receiving event information of a user and generating and storing a set of events of the user.

FIG. 7 illustrates an example method 700 of receiving event information of a user and generating and storing a set of events of the user, such as using an authentication application or an authentication service, etc.

At step 701, event information can be received from or about the user. In certain examples, the event information can be received at an authentication application of a user device or by an authentication service, in certain examples, connected to the authentication application through a network, etc. In an example, certain user information can be received, such as from a user profile stored by a database. In other examples, user information can be received from the user, such as offered by the user in response to a provided inquiry (e.g., a set of questions, a question library, etc.), such as presented using a display. In certain examples, the event information can include keywords about respective events or icons or representative images of the respective events, and in certain examples, respective dates associated with each of the respective events.

At step 702, events can be generated using the received user information. In certain examples, event icons can be detected, such as using a library of generic icons. In an example, draft events can be presented to the user for acceptance, changes, or confirmation. In other examples, the library of generic icons can be presented to the user for selection. Additionally, a chronological order of the generated events can be determined, such as using information received from the user, or by the user placing selected or accepted icons or event information in a chronological order, from earliest in time to latest in time, such that the chronological order is with respect to other generated events of the set, the subset, etc.

At step 703, the set of generated events can be stored in the chronological order as the set of stored user-ordered events, and used as discussed herein.

Figure 8:
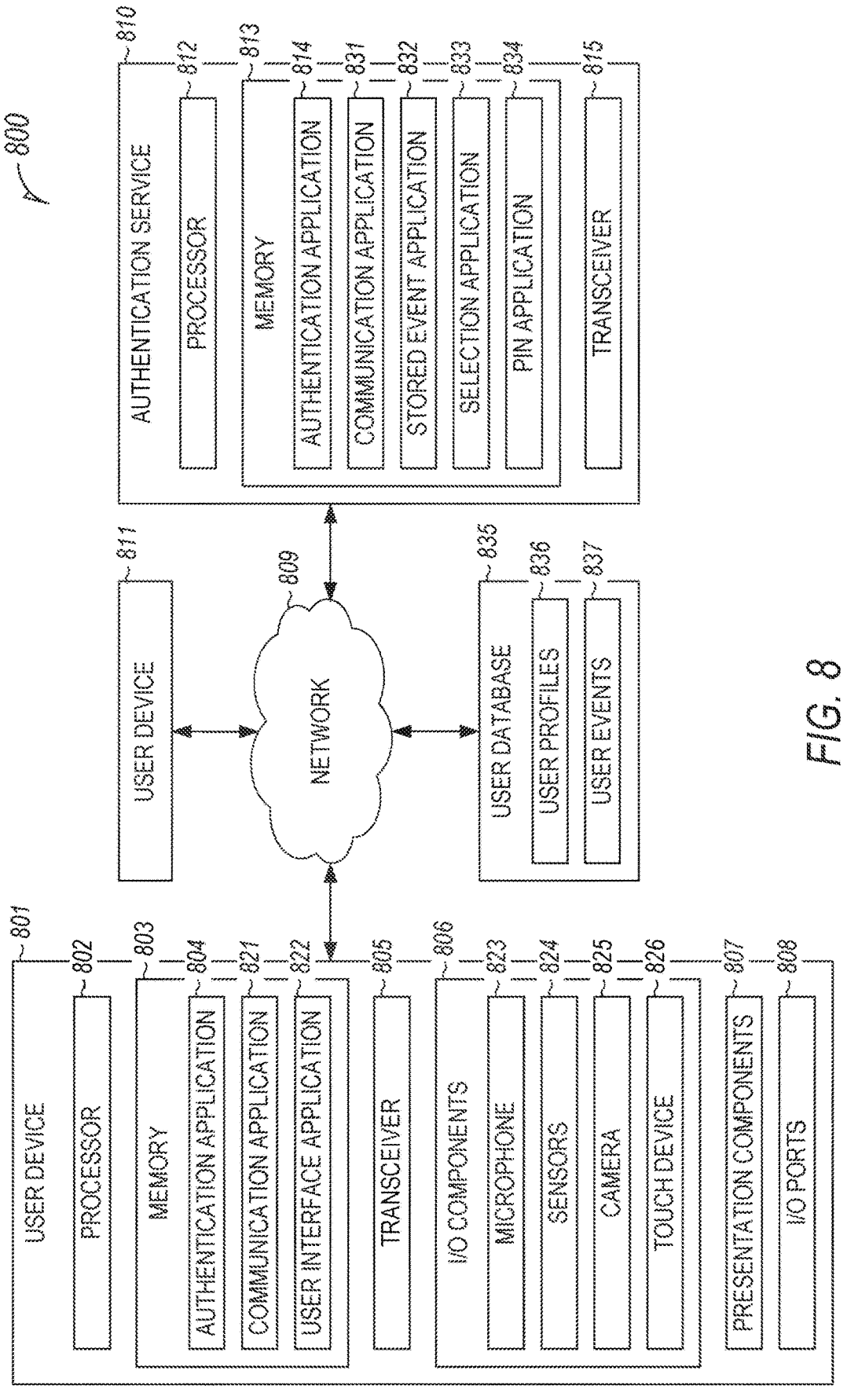
FIG. 8 illustrates an example networking environment including one or more user devices, a communication server, and a user database communicating over a network.

FIG. 8 illustrates an example system 800 including first and second user devices 801, 811 in a networking environment including an authentication service 810 and a user database 835 communicating over a network 809.

The first user device 801 is exemplary, and can include a processor 802 (e.g., one or more processors), a memory 803, a transceiver 805, input/output (I/O) components 806, one or more presentation components 807, and one or more I/O ports 808. The first user device 801 can take the form of a mobile computing device or any other portable device, such as a mobile telephone, laptop, tablet, computing pad, notebook, gaming device, portable media player, etc. In other examples, the first user device 801 can include a less portable device, such as desktop personal computer, kiosk, tabletop device, industrial control device, etc. Other examples can incorporate the first user device 801 as part of a multi-device system in which two separate physical devices share or otherwise provide access to the illustrated components of the first user device 801.

The processor 802 can include any quantity of processing units and is programmed to execute computer-executable instructions for implementing aspects of the disclosure. The instructions may be performed by the processor or by multiple processors within the computing device or performed by a processor external to the first user device 801. In some examples, the processor 802 is programmed to execute methods, such as the one or more methods illustrated herein, etc. Additionally, or alternatively, the processor 802 can be programmed to present an experience in a user interface ("UI"). For example, the processor 802 can represent an implementation of techniques to perform the operations described herein.

The transceiver 805 can include an antenna capable of transmitting and receiving radio frequency ("RF") signals and various antenna and corresponding chipsets to provide communicative capabilities between the first user device 801 and one or more other remote devices. Examples are not limited to RF signaling, however, as various other communication modalities may alternatively be used.

The presentation components 807 can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user of the first user device 801 or provide information visibly or audibly on the first user device 801. For example, the first user device 801 can include a smart phone or a mobile tablet including speakers capable of playing audible search results to the user. In other examples, the first user device 801 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio presentation components 807.

I/O ports 808 allow the first user device 801 to be logically coupled to other devices and I/O components 816, some of which may be built into user device 801 while others may be external. I/O components 806 can include a microphone 823, one or more sensors 824, a camera 825, and a touch device 826. The microphone 823 can capture speech from the user and/or speech of or by the user. The sensors 824 can include any number of sensors on or in a mobile computing device, electronic toy, gaming console, wearable device, television, vehicle, or other user device 801, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user or the environment. The camera 825 can capture images or video of or by the user. The touch device 826 can include a touchpad, track pad, touch screen, or other touch-capturing device. In other examples, the I/O components 806 can include one or more of a sound card, a vibrating device, a scanner, a printer, a wireless communication device, or any other component for capturing information related to the user or the environment.

The memory 803 can include any quantity of memory associated with or accessible by the first user device 801. The memory 803 can be internal to the first user device 801, external to the first user device 801, or a combination thereof. The memory 803 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the first user device 801. The terms computer-readable medium, machine readable medium, and storage device do not include carrier waves to the extent carrier waves are deemed too transitory. The memory 803 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 803 can be distributed across multiple user devices, such as in a virtualized environment in which instruction processing is carried out on multiple ones of the first user device 801. The memory 803 can store, among other data, various device applications that, when executed by the processor 802, operate to perform functionality on the first user device 801. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 809. For example, the applications can include client-operating applications that correspond to server-side applications executing on remote servers or computing devices in the cloud.

Instructions stored in the memory 803 can include, among other things, one or more of an authentication application 804, a communication application 821, and a user interface application 822 executed on the first user device 801. The communication application 821 can include one or more of computer-executable instructions for operating a network interface card and a driver for operating the network interface card. Communication between the first user device 801 and other devices can occur using any protocol or mechanism over a wired or wireless connection or across the network 809. In some examples, the communication application 821 is operable with RF and short-range communication technologies using electronic tags, such as NFC tags, Bluetooth® brand tags, etc.

In some examples, the user interface application 822 includes a graphics application for displaying data to the user and receiving data from the user. The user interface application 822 can include computer-executable instructions for operating the graphics card to display search results and corresponding images or speech on or through the presentation components 807. The user interface application 822 can interact with the various sensors 824 and camera 825 to both capture and present information through the presentation components 807.

The authentication service 810 can be configured to receive user and environment data, such as received from the first and second user devices 801, 811, or one or more other devices, over the network 809. In certain examples, the authentication service 810 can include one or more servers, memory, databases, or processors, configured to execute different web-service computer-executable instructions, and can be configured to provide and manage one or more authentication services for one or more users or groups of users, such as users of the first and second user devices 801, 811. The authentication service 810 can be capable of providing and receiving messages or other information including images, videos, audio, text, and other communication media to or from the first and second user devices 801, 811 over the network 809.

The networking environment illustrated in FIG. 8 is an example of one suitable computing system environment and is not intended to suggest any limitation as to the scope of use or functionality of examples disclosed herein. The illustrated networking environment should not be interpreted as having any dependency or requirement related to any single component, module, index, or combination thereof, and in other examples, other network environments are contemplated.

The network 809 can include the internet, a private network, a local area network (LAN), a wide area network (WAN), or any other computer network, including various network interfaces, adapters, modems, and other networking devices for communicatively connecting the first and second user devices 801, 811 and the authentication service 810. The network 809 can also include configurations for point-to-point connections.

The authentication service 810 includes a processor 812 to process executable instructions, a memory 813 embodied with executable instructions, and a transceiver 815 to communicate over the network 809. The memory 813 can include one or more of: an authentication application 814, a communication application 831, a stored event application 832, a selection application 833, a pin application 834, or one or more other applications, modules, or devices, etc. While the authentication service 810 is illustrated as a single box, it is not so limited, and can be scalable. For example, the authentication service 810 can include multiple servers operating various portions of software that collectively generate composite icons or templates for users of the first and second user devices 801, 811.

The user database 835 can provide backend storage of Web, user, and environment data that can be accessed over the network 809 by the authentication service 810 or the first user device 801 and used by the authentication service 810 to combine subsequent data in a communication stream. The Web, user, and environment data stored in the database includes, for example but without limitation, one or more user profiles 836 and user events 837. The user events 837 can include one or more events and associated times, relative or with respect to specific dates or date ranges, etc. and text descriptions or summary images or icons of such events. Additionally, though not shown for the sake of clarity, the servers of the user database 835 can include their own processors, transceivers, and memory. Also, the networking environment depicts the user database 835 as a collection of separate devices from the authentication service 810. However, examples can store the discussed Web, user, and environment data shown in the user database 835 on the authentication service 810.

The user profiles 836 can include electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile can be built through probing questions to the user or through analyzing the user's behavior on one or more user devices. The user events 837 can include information about personal events of a respective user, including, in certain examples, information from the user profile, or other information about or from the user, as described above.

Additionally, the user profiles 836 can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 836 can be expanded to encompass various other aspects of the user.

The present disclosure relates to systems and methods for providing a command-based personalized composite template in a communication stream according to at least the examples provided in the sections below:

(A1) In one aspect, some embodiments or examples include determining a custom personal identification number (PIN) for a user based on an ordered series of events, including responsive to receiving a request for the custom PIN, generating the custom PIN for the user based on a set of stored events, each event associated with a point in time, the generating including selecting a subset of events from the set of stored events, determining a chronological order of the selected subset of events based on the associated point in time for each of the selected subset of events and assigning each of the selected subset of events a chronological identifier representative of a position of the respective event in the determined chronological order, and determining the custom PIN as an arrangement of the chronological identifiers in an arranged order that is not chronological, causing the selected subset of events to be presented to the user in the arranged order, receiving, responsive to causing the selected subset of events to be presented to the user, an indication of a chronological arrangement of the selected subset of events from the user, and authenticating the user responsive to determining that received indication of the chronological arrangement matches the determined custom PIN.

(A2) In some embodiments of A1, determining the custom PIN as an arrangement of the chronological identifiers includes determining the custom PIN as a random arrangement of the chronological identifier in an order that is not chronological.

(A3) In some embodiments of A1-A2, some embodiments or examples include receiving event information from the user, generating a set of events and a chronological order of the set of stored events using the received event information, and storing the set of generated events in the chronological order as the set of stored events.

(A4) In some embodiments of A1-A3, some embodiments or examples include causing a first set of questions to be presented to the user through a display, and receiving event information includes receiving responses to the provided set of questions.

(A5) In some embodiments of A1-A4, the custom PIN has a number of digits greater than 2, and determining the custom PIN includes using the arranged order of the selected subset of events.

(A6) In some embodiments of A1-A5, selecting the subset of events includes selecting more than two of the set of stored events, including selecting two of the set of stored events that occurred within a threshold time or within a threshold position in the set of stored events.

(A7) In some embodiments of A1-A6, causing the selected subset of events to be presented to the user includes causing images representative of each of the selected subset of events to be presented to the user in the order of the selected subset of events, receiving the indication of the chronological arrangement includes receiving a sequence of positions of the presented selected subsets of events in chronological order, and determining that the received indication of the chronological arrangement matches the custom PIN includes determining that the received sequence of positions of the presented selected subsets of events in chronological order matches the custom PIN.

(A8) In some embodiments of A1-A7, receiving the indication of the chronological arrangement includes receiving an order of the presented selected subset of events in numbers, determining that the received indication of the chronological arrangement matches the custom PIN includes determining that the received order of the presented selected subset of events in numbers matches the custom PIN, and authenticating the user includes providing the user access to a requested resource or providing an indication of authentication of the user to the requested resource.

(A9) In some embodiments of A1-A8, the received order includes a user-input number based on the presented selected subset of events, and authenticating the user includes comparing the determined custom PIN to the received user-input number and providing, based on the comparing, an indication of authentication of the user in response to determining that the determined custom PIN matches the received user-input number.

(A10) In some embodiments of A1-A9, authenticating the user includes responsive to receiving the chronological arrangement within a threshold time of presenting causing the selected subset of events to be presented to the user and the received chronological arrangement matching the determined custom PIN.

In yet another aspect, some embodiments include a system including a processor and a memory device coupled to the processor and having a program stored thereon for execution by the processor to perform operations comprising any of the embodiments of A1-A9 described above in various combinations or permutations. In yet another aspect, some embodiments include a non-transitory computer-readable storage medium storing one or more programs for execution by one or more processors of a storage device, the one or more programs including instructions for performing any of the embodiments of A1-A9 described above in various combinations or permutations. In yet another aspect, some embodiments include a method or a system including means for performing any of the embodiments of A1-A9 described above in various combinations or permutations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A method for authenticating a user based on user-specific event ordering, the method comprising:
   determining a custom personal identification number (PIN) as an arrangement of a plurality of unique digits that are not in sequential order;
   selecting a plurality of user-specific events from a set of stored user-specific events, each user-specific event associated with an event time provided by the user, the event time indicating the time at which the event occurred;

arranging the selected plurality of user-specific events in an order determined by the plurality of digits of the custom PIN, by:

positioning the user-specific event having the earliest event time in the position of the lowest value digit of the custom PIN;

positioning the user-specific event having the second earliest event time in the position of the second lowest value digit of the custom PIN; and continuing to arrange each remaining selected user-specific event in an order corresponding to its event time and the value of the corresponding digit in the custom PIN, resulting in the selected user-specific events being ordered in a non-chronological order that matches the arrangement of digits in the custom PIN;

causing the arranged plurality of user-specific events to be presented to the user;

receiving input from the user; and authenticating the user based on the received input correctly indicating the chronological order of the presented user-specific events.

2. The method of claim 1, wherein selecting a plurality of user-specific events from a set of stored user-specific events comprises selecting a number of user-specific events that is equal to the number of digits in the custom PIN.

3. The method of claim 1, wherein causing the arranged plurality of user-specific events to be presented to the user comprises:

causing a description of each user-specific event to be presented, or causing an image depicting each user-specific event to be presented.

4. The method of claim 3, further comprising:

prompting the user to authenticate by selecting each user-specific event, one user-specific event at a time, in chronological order based on the event time associated with each event.

5. The method of claim 3, further comprising:

prompting the user to authenticate by requesting the user to enter the custom PIN using a numeric keypad.

6. The method of claim 5, wherein the numeric keypad is presented via a touch-screen display.

7. The method of claim 3, wherein causing the arranged plurality of user-specific events to be presented to the user comprises causing the arranged plurality of user-specific events to be presented via a touch-screen display, the method further comprising:

prompting the user, via the touch-screen display, to authenticate by requesting the user to drag and drop each user-specific event into a chronological order.

8. The method of claim 3, wherein causing the arranged plurality of user-specific events to be presented to the user comprises causing the arranged plurality of user-specific events to be presented via a touch-screen display, the method further comprising:

prompting the user, via the touch-screen display, to authenticate by requesting the user to swap positions of the user-specific events to arrange them in chronological order.

9. The method of claim 1, further comprising:

requesting the user to provide specific date information for at least one of the presented user-specific events as an additional verification step.

10. A system for authenticating a user based on user-specific event ordering, the system comprising:

one or more processors; and a memory storing computer-executable instructions that, when executed, cause the one or more processors to control the system to perform operations comprising:

determining a custom personal identification number (PIN) as an arrangement of a plurality of unique digits that are not in sequential order;

selecting a plurality of user-specific events from a set of stored user-specific events, each user-specific event associated with an event time provided by the user, the event time indicating the time at which the event occurred;

arranging the selected plurality of user-specific events in an order determined by the plurality of digits of the custom PIN, by:

positioning the user-specific event having the earliest event time in the position of the lowest value digit of the custom PIN;

positioning the user-specific event having the second earliest event time in the position of the second lowest value digit of the custom PIN; and continuing to arrange each remaining selected user-specific event in an order corresponding to its event time and the value of the corresponding digit in the custom PIN, resulting in the selected user-specific events being ordered in a non-chronological order that matches the arrangement of digits in the custom PIN;

causing the arranged plurality of user-specific events to be presented to the user;

receiving input from the user; and authenticating the user based on the received input correctly indicating the chronological order of the presented user-specific events.

11. The system of claim 10, wherein selecting a plurality of user-specific events from a set of stored user-specific events comprises selecting a number of user-specific events that is equal to the number of digits in the custom PIN.

12. The system of claim 10, wherein causing the arranged plurality of user-specific events to be presented to the user comprises:

causing a description of each user-specific event to be presented, or causing an image depicting each user-specific event to be presented.

13. The system of claim 12, wherein the instructions cause the system to perform further operations comprising:

prompting the user to authenticate by selecting each user-specific event, one user-specific event at a time, in chronological order based on the event time associated with each event.

14. The system of claim 12, wherein the instructions cause the system to perform further operations comprising:

prompting the user to authenticate by requesting the user to enter the custom PIN using a numeric keypad.

15. The system of claim 14, wherein the numeric keypad is presented via a touch-screen display.

16. The system of claim 12, wherein causing the arranged plurality of user-specific events to be presented to the user comprises causing the arranged plurality of user-specific events to be presented via a touch-screen display, the method further comprising:

prompting the user, via the touch-screen display, to authenticate by requesting the user to drag and drop each user-specific event into a chronological order.

17. The system of claim 12, wherein causing the arranged plurality of user-specific events to be presented to the user comprises causing the arranged plurality of user-specific events to be presented via a touch-screen display, the method further comprising:

prompting the user, via the touch-screen display, to authenticate by requesting the user to swap positions of the user-specific events to arrange them in chronological order.

18. The system of claim 10, wherein the instructions cause the system to perform further operations comprising:

requesting the user to provide specific date information for at least one of the presented user-specific events as an additional verification step.

19. A non-tangible machine readable storage device storing instructions thereon, which, when executed by a processor, cause the processor to perform operations comprising:

determining a custom personal identification number (PIN) as an arrangement of a plurality of unique digits that are not in sequential order;

selecting a plurality of user-specific events from a set of stored user-specific events, each user-specific event associated with an event time provided by the user, the event time indicating the time at which the event occurred;

arranging the selected plurality of user-specific events in an order determined by the plurality of digits of the custom PIN, by:

positioning the user-specific event having the earliest event time in the position of the lowest value digit of the custom PIN;

positioning the user-specific event having the second earliest event time in the position of the second lowest value digit of the custom PIN; and continuing to arrange each remaining selected user-specific event in an order corresponding to its event time and the value of the corresponding digit in the custom PIN, resulting in the selected user-specific events being ordered in a non-chronological order that matches the arrangement of digits in the custom PIN;

causing the arranged plurality of user-specific events to be presented to the user;

receiving input from the user; and authenticating the user based on the received input correctly indicating the chronological order of the presented user-specific events.

20. The non-tangible machine readable storage device of claim 10, storing instructions thereon, which, when executed by a processor, cause the processor to perform further operations comprising:

prompting the user to authenticate by selecting each user-specific event, one user-specific event at a time, in chronological order based on the event time associated with each event.

\* \* \* \* \*